(12) United States Patent
Johnson

(10) Patent No.: US 6,569,335 B1
(45) Date of Patent: May 27, 2003

(54) WASTEWATER TREATMENT CONTROL METHOD AND APPARATUS

(76) Inventor: Walter S. Johnson, 4834 Katrina Way, Las Vegas, NV (US) 89147

( * ) Notice: Subject to any disclaimer, the term of this patent is extended or adjusted under 35 U.S.C. 154(b) by 137 days.

(21) Appl. No.: 09/882,644

(22) Filed: Jun. 15, 2001

Related U.S. Application Data

(60) Provisional application No. 60/218,365, filed on Jul. 13, 2000.

(51) Int. Cl.$^7$ ................................................. C02F 3/00
(52) U.S. Cl. ........................ 210/614; 210/103; 210/143; 210/197
(58) Field of Search ................................ 210/739, 745, 210/740, 614, 620, 623, 626–628, 103, 143, 197

(56) References Cited

U.S. PATENT DOCUMENTS

| | | | | |
|---|---|---|---|---|
| 4,442,005 A | * | 4/1984 | Breider ........................ | 210/614 |
| 5,094,752 A | * | 3/1992 | Davis et al. ................. | 210/614 |
| 5,324,431 A | * | 6/1994 | Watanabe et al. ........... | 210/614 |
| 5,558,774 A | * | 9/1996 | Tonelli et al. .............. | 210/612 |
| 5,858,222 A | * | 1/1999 | Shibata et al. .............. | 210/177 |
| 5,985,649 A | * | 11/1999 | Stensel et al. .............. | 435/266 |

FOREIGN PATENT DOCUMENTS

JP 359059294 A * 4/1984

* cited by examiner

*Primary Examiner*—Chester T. Barry
(74) *Attorney, Agent, or Firm*—Anderson & Morishita; Robert Ryan Morishita

(57) ABSTRACT

The control method and apparatus of the present invention is directed for an activated sludge wastewater treatment process. Instrumentation for measuring suspended solids concentration in the aeration tank and in the WAS flow stream communicates with a data processor having at least one data structure. The data structure stores algorithms, constant values including the volume of the aeration tank ($V_{AerationTank}$), and unit conversion factors. In use, the user inputs to the data processor a desired solids retention time ($SRT_{Desired}$) to optimize the treatment process. The data processor receives data from the MLSS instrumentation and the WASSS instrumentation and calculates the optimum WAS flow rate according to the following formula:

$$WAS\ flow\ rate = \frac{MLSS \times V_{AerationTank}}{SRT_{Desired} \times WASSS}$$

Optionally, the data processor commands valves or pumps to achieve the calculated WAS flow rate to thereby drive the waste treatment process toward a constant SRT.

14 Claims, 1 Drawing Sheet

WASTEWATER TREATMENT CONTROL METHOD AND APPARATUS

RELATED APPLICATION DATA

The present application claims the priority of U.S. Provisional Application Serial No. 60/218,365 entitled "Wastewater Treatment Control Method and Apparatus" filed Jul. 13, 2000 by Applicant herein.

FIELD OF THE INVENTION

The present invention pertains to wastewater treatment control methods and devices. Specifically, the present invention is a method and apparatus for controlling activated sludge wastewater treatment systems to optimize the treatment and minimize swings in the quality of the resulting treated effluent.

BACKGROUND OF THE INVENTION

The process using activated sludge to treat wastewater is well known in the art. Briefly stated, activated sludge is a sludge containing living micro-organisms, mainly bacteria. Most wastewater treatment plants, except for the very smallest plants, include a primary treatment stage, typically a settling process, followed by a secondary treatment stage, typically a biological process utilizing an activated sludge process. The primary stage, known in the art as "primary treatment," usually consists of a tank, or a number of tanks operating in parallel, where flow velocity is slowed to permit settling and consequent separation of settleable solids.

In the second stage of the treatment plant, known in the art as "secondary treatment," the wastewater is directed to an aeration tank where activated sludge is combined with the wastewater influent to form a suspension or a "mixed liquor." The micro-organisms of the activated sludge consume and digest suspended and colloidal organic solids in an aerobic process. In this aerobic metabolic process, the micro-organisms break down complex organic molecules into simple waste products, which are, in turn, broken down by other micro-organisms until the micro-organisms can no longer break down the waste products. The micro-organisms in the aeration tank grow and multiply as allowed by the quantities of air and consumable organic solids available.

Continuing with the second stage of the process, the mixed liquor from the aeration tank is directed to a secondary clarifier or secondary sedimentation tank. The effluent is stored to allow solids and suspended activated sludge to settle. The treated wastewater is removed from the secondary clarifier.

Contemporaneously, a portion of the activated sludge, referred to as return activated sludge or RAS, is drawn from the secondary clarifier and returned to the aeration tank to maintain the population of micro-organisms in the aeration tank. That is, a portion of the activated sludge leaving the aeration tank as a suspension in the mixed liquor is returned to the aeration tank from the secondary clarifier to replace some of the activated sludge lost as a suspension in the mixed liquor as well as some of that lost due to death of the micro-organisms in the aeration tank. However, the quantity of RAS does not precisely equal the quantity of sludge required in the aeration tank because the reproduction of micro-organisms in the aeration tank must also be accounted for. Therefore, a certain amount of micro-organisms must be wasted from the system by wasting a portion of the sludge that has settled in the secondary clarifier. The portion of the activated sludge that is wasted is referred to as waste activated sludge or WAS. It is well known in the art that the precise amount of wasted micro-organisms can be difficult to calculate because of varying influent and effluent flow rates and concentration amounts during any particular time period.

As alluded to above, one challenge of controlling the activated sludge treatment process is controlling the flow of WAS to optimize the wastewater treatment process. One known method for controlling the flow of WAS and, therefore, the wastewater treatment process, includes manually grabbing a sample of the mixed liquor, manually analyzing the mixed liquor sample to determine the mixed liquor suspended solids concentration ("MLSS concentration"), and estimating or calculating the WAS flow rate to reach and maintain the desired MLSS concentration. The drawback to this method is that the manual collection and analysis is time consuming and labor intensive. Also, it is subject to errors in sampling and lab analyses. Moreover, if the treatment includes more than one parallel activated sludge process, the collection and analysis must be performed for each process. Also, the time and effort involved in calculating the WAS flow rate is time consuming, especially if it has to be frequently during the day as happens in many treatment plants.

However, even if manual collection and analysis is replaced with instrumentation to allow automatic collection of samples and analysis of data, controlling the treatment process based on the MLSS concentration does not adequately account for variables such as the flow rates and organic loading rates that could be changing at any particular time. For example, it is known that wastewater influent flow rates into the wastewater treatment system increase during morning hours and that organic concentrations also vary during the day. Also, these flows and concentrations change from day to day, week to week, and season to season. Such variables can be significant because swings in flow rate can cause swings in concentrations in the various treatment processes that result in possible swings in the effectiveness in the treatment process. In other words, during such swings, the effluent water leaving the treatment process may not have been treated adequately and may be hazardous and violate regulatory standards.

Therefore, it can be seen that there is a need in the art for a control method and apparatus that allows stable and continuous control of a wastewater treatment process.

SUMMARY OF THE INVENTION

The control method and apparatus of the present invention is directed for an activated sludge wastewater treatment process. More specifically, the present method and apparatus is directed for use with a wastewater treatment process in which wastewater is combined with activated sludge in an aeration tank to form a mixed liquor. The mixed liquor is treated in an aerobic metabolic process and the treated mixed liquor is directed to a clarifier where the suspended activated sludge is allowed to settle out of the mixed liquor. A portion of the activated sludge is returned to the aeration tank ("return activated sludge" or "RAS") and a portion of the activated sludge is wasted off ("waste activated sludge" or "WAS") and handled in another portion of the wastewater treatment plant.

According to the present invention, instrumentation for measuring suspended solids concentration is located in the aeration tank and in the WAS flow stream. These instruments measure mixed liquor suspended solids concentration ("MLSS") and waste activated sludge suspended solids concentration ("WASSS"), respectively. Optionally, the instruments may be a probe and suspended solids analyzer known in the art. In an optional embodiment, the instrumentation takes measurements and transmits data every second.

The MLSS instrumentation and the WASSS instrumentation communicate with a data processor having at least one data structure. The data structure stores algorithms along with constant values including the volume of the aeration tank ($V_{AerationTank}$) and unit conversion constants. An input device also communicates with the data processor.

In use, the user inputs a desired solids retention time ($SRT_{Desired}$) to Optimize the treatment process. The data processor utilizes data gathered from the MLSS instrumentation and the WASSS instrumentation to calculate the desired flow rate of the WAS according to the following formula:

$$WAS\ flow\ rate = \frac{MLSS \times V_{AerationTank}}{SRT_{Desired} \times WASSS}$$

While the MLSS and WASSS measurements used could be instantaneous measurements, in an optional embodiment, average or mean MLSS and WASSS values calculated over a set predetermined period of time, such as twenty-four hours, may be used. Such a period of time is optimized to reflect the effects of control adjustments.

In an optional embodiment, the processor merely outputs the WAS flow rate calculated to achieve the desired SRT to a display. However, in an alternate embodiment, the data processor communicates with WAS flow controllers that open or close valves or alter the speed of electric motors operating pumps to achieve the optimum WAS flow rate.

It is an object of the present invention to provide a wastewater treatment control method and apparatus for an activated sludge process that controls the wasting rate of activated sludge and, thus, the overall activated sludge process in a stable and efficient fashion.

DESCRIPTION

Figure 1:
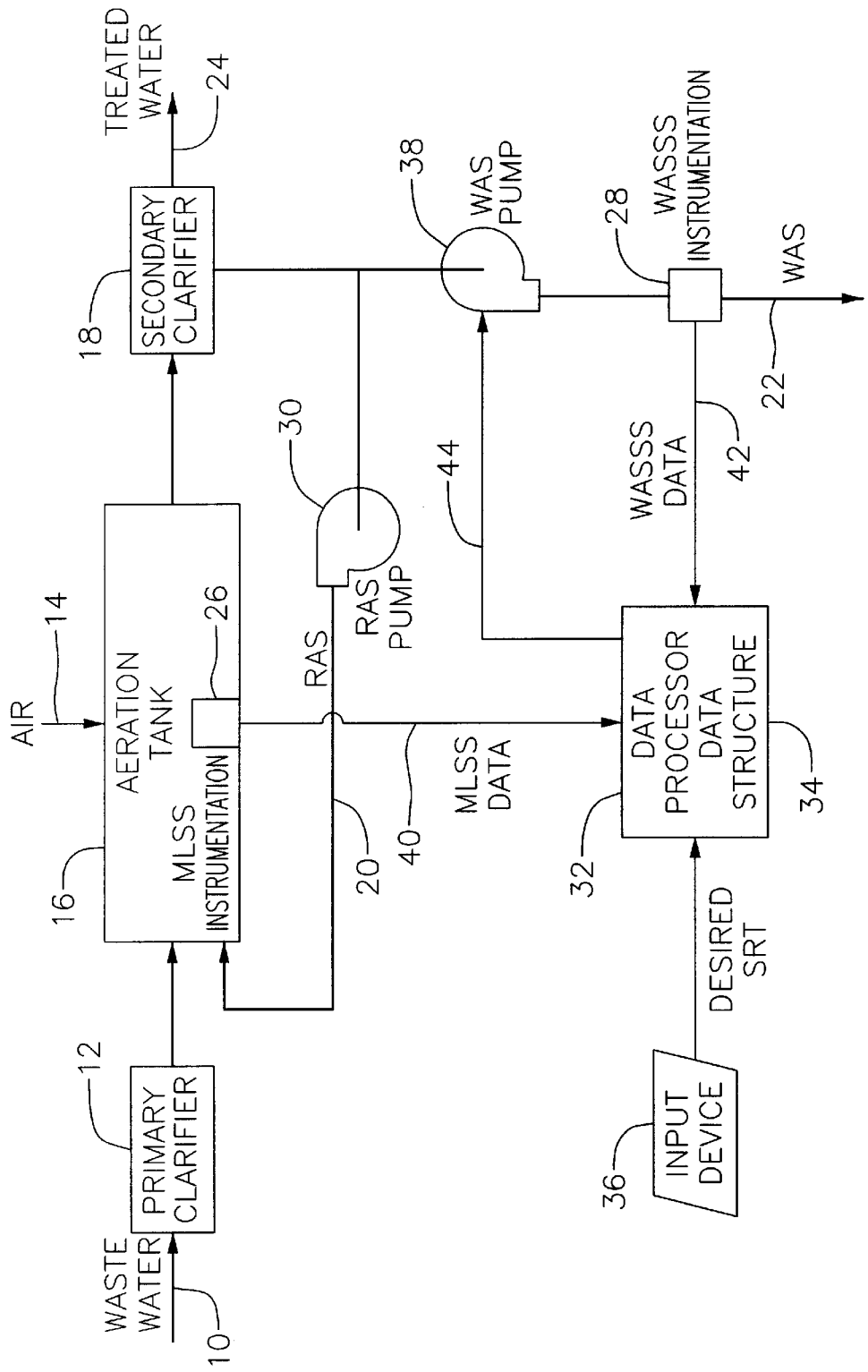
FIG. 1 is a block diagram of the wastewater treatment control method and apparatus according to an embodiment of the present invention.

Reference is now made to the figures wherein like parts are referred to by like numerals throughout. Referring to FIG. 1, the present invention is a control method and apparatus adapted for use in controlling an activated sludge wastewater treatment system. Such an activated sludge wastewater treatment system includes an aeration tank 16 and a secondary clarifier 18. Optionally, the system may additionally include a primary clarifier 12. In the activated sludge system, wastewater 10 enters the primary clarifier 12 where large solids are allowed to settle out.

The wastewater is then directed to an aeration tank 16 where the effluent from the primary clarifier 12 is combined with activated sludge to form a mixed liquor. Briefly stated, activated sludge is a sludge containing micro-organisms known to metabolize dissolved and suspended organic solids in wastewater. Air 14 is injected into the mixed liquor in the aeration tank 16. The mixed liquor is aerated to allow the micro-organisms of the activated sludge to metabolize the complex suspended solids into simple suspended solids in an aerobic reaction using the oxygen from the injected air.

The mixed liquor is directed from the aeration tank 16 to a secondary clarifier 18 where the products of the aerobic reaction as well as the activated sludge itself are allowed to settle. The treated water 24 is removed from the secondary clarifier 18. A portion of the settled activated sludge is returned to the aeration tank 16. This portion of the activated sludge is referred to as the "return activated sludge" or "RAS" 20. The remaining activated sludge is wasted for further treatment and disposal. This portion of the activated sludge is referred to as the "waste activated sludge" or "WAS" 22. A flow control apparatus controls the WAS flow rate and could take various forms. For example, the flow could be controlled through the use of throttling valves (not shown) coupled with pumps driven by constant speed motors. Alternatively, flow could be controlled through a pump 38 driven by a variable speed motor.

According to the control method and apparatus of the present invention, instrumentation 26, 28 to measure suspended solids concentration is placed in the WAS stream 22 or the RAS stream 20 and the aeration tank 16. The instrumentation 28 in the WAS flow stream 22 or the RAS stream 20 measures waste activated sludge suspended solids concentration ("WASSS"). Because the RAS stream 20 and the WAS stream 22 have the same suspended solids concentration, the instrumentation to measure WASSS may be placed in either the RAS stream 20 or the WAS stream 22. Similarly, the instrumentation 26 in the aeration tank 16 measures mixed liquor suspended solids concentration ("MLSS"). Such instrumentation 26, 28 is known in the prior art as an on line suspended solids analyzer and typically includes a probe, an analyzer, and a means for communicating or optionally storing the data collected. In an optional embodiment, the instrumentation 26, 28 takes measurements in real time or, alternatively, in relatively short periods, such as one second periods.

The present invention further includes a data processor 32 having at least one data structure 34. For example, conventional computer systems known in the wastewater treatment art, such as SCADA or DCS computer systems, could be employed. The data processor 32 receives MLSS data 40 and WASSS 42 data from the WASSS instrumentation 28 and the MLSS instrumentation 26, respectively. Also, the data processor 32 includes an input device 36, such as a keyboard or keypad.

The data structure 34 of the data processor 32 stores the algorithm described hereinafter as well as constants required for the algorithm such as the volume of the aeration tank 16 ($V_{AerationTank}$) and unit conversion factors. The data structure 34 may be of any type known in the art including RAM, ROM, EPROM, EAROM, optical storage media, magnetic storage media, or the like.

The algorithm described below allows control of the wastewater treatment process using a constant solids retention time ("SRT"). A constant SRT method reduces erratic swings caused by changing flow rates and flow volumes. Such a method utilizes the mass of solids in the system and the mass of solids per unit time leaving the system. While the present method could optionally include the total mass in the system, i.e. include mass in the clarifier 18, and the total mass leaving the system, i.e. include mass leaving in the treated water 24, the example below simplifies the calculation by excluding the mass in the clarifier 18 and the mass leaving through the treated water 24.

Based on the MLSS data 40 and WASSS data 42 collected and the desired solids retention time ($SRT_{Desired}$) input by an operator at the input device 36, the data processor 32 calculates the WAS flow rate to achieve the desired SRT using the following formula:

$$WAS\ flow\ rate = \frac{MLSS \times V_{AerationTank}}{SRT_{Desired} \times WASSS}$$

In making this calculation, WAS flow rate is typically expressed in million gallons per day, MLSS and WASSS are expressed in milligrams per liter, $V_{AerationTank}$ is expressed in million gallons, and $SRT_{Desired}$ is expressed in days and appropriate unit conversion factors are applied. Alternatively, to express the WAS flow rate in the commonly accepted units of gallons per minute, an appropriate unit conversion factor is applied, i.e., 694.4.

In setting the desired SRT, operators look to optimal SRT levels well known in the art. The WASSS and MLSS values used to calculate the WAS flow rate may be instantaneous measurements or may be mean or average values calculated over a predetermined period of time. For example, the WASSS values and MLSS values used by the data processor 32 may be the mean of the WASSS data 42 collected over twenty-four hours and the mean of the MLSS data 40 collected over twenty-four hours. In such an optional embodiment, the period of time selected should allow the WASSS and MLSS values to reflect the flow control adjustments.

Based on the WAS flow rate calculated by the data processor 32, in an optional embodiment, the data processor 32 may communicate commands 44 to the flow control apparatus or the like to open or close valves or vary the speed of a variable speed pump 38 to set the WAS flow rate calculated to achieve the desired SRT. In such an embodiment, the adjustments may be continuous to move toward the desired SRT in real time. For example, in the embodiment of FIG. 1, a RAS pump 30 and a WAS pump 38 are disposed in the RAS stream 20 and the WAS stream 22 respectively. Varying the speed of the WAS pump 38 could accomplish the WAS flow rate calculated to achieve the desired SRT.

Additionally or alternatively, the invention may include a display (not shown) communicating with the data processor 32. In such an embodiment, the data processor 32 may display the calculated WAS flow rate at a display. This would allow the operator to manually operate the flow control apparatus to open or close valves (not shown) or vary the speed of a variable speed pump 38 to set the WAS flow rate calculated to achieve the desired SRT.

While certain embodiments of the present invention have been shown and described, it is to be understood that the present invention is subject to many modifications and changes without departing from the spirit and scope of the claims presented herein.

I claim:

1. A method for controlling an activated sludge wastewater treatment process in which influent wastewater is mixed with activated sludge in an aeration tank to form a mixed liquor, the mixed liquor being directed to a clarifier wherein a portion of the activated sludge settles from the mixed liquor such that a portion of the settled activated sludge, the return activated sludge, is drawn from said clarifier and returned to said aeration tank and the remaining settled activated sludge, the waste activated sludge, is wasted from said clarifier, comprising:

measuring the suspended solids concentration in the waste activated sludge, WASSS, and the aeration tank, MLSS;

providing a data processor having at least one data structure storing the volume of the aeration tank, $V_{AerationTank}$, and an input device;

communicating the MLSS and WASSS measurements to said data processor;

inputting at said input device a desired solids retention time, $SRT_{Desired}$;

said data processor calculating the flow rate of the waste activated sludge, WAS flow rate, according to the formula:

$$WAS\ flow\ rate = \frac{MLSS \times V_{AerationTank}}{SRT_{Desired} \times WASSS};\ and$$

controlling the flow rate of the waste activated sludge in response to said calculated WAS flow rate.

2. The method of claim 1 wherein said measurements are collected and transmitted in one second intervals.

3. The method of claim 1 wherein said MLSS and WASSS values used to calculate WAS flow rate are instantaneous values.

4. The method of claim 1 wherein said MLSS and WASSS values used to calculate WAS flow rate are mean values over a fixed predetermined time period.

5. A method for treating wastewater comprising:

mixing influent wastewater with activated sludge in an aeration tank to form a mixed liquor, said activated sludge including micro-organisms to metabolize suspended solids in said wastewater;

injecting oxygen into said aeration tank to promote aerobic metabolisis of suspended solids by said micro-organisms;

directing mixed liquor to a clarifier whereby a portion of the activated sludge settles from the mixed liquor;

drawing a portion of the settled activated sludge, the return activated sludge, from said clarifier and directing the return activated sludge to said aeration tank;

wasting the remaining settled activated sludge, the waste activated sludge, from said clarifier;

measuring the suspended solids concentration in the waste activated sludge, WASSS, and in the aeration tank, MLSS;

providing a data processor having at least one data structure storing the volume of the aeration tank, $V_{AerationTank}$, and an input device;

communicating the MLSS and WASSS measurements to said data processor;

inputting at said input device a desired solids retention time, $SRT_{Desired}$;

said data processor calculating the flow rate of the waste activated sludge, WAS flow rate, according to the formula:

$$WAS\ flow\ rate = \frac{MLSS \times V_{AerationTank}}{SRT_{Desired} \times WASSS};\ and$$

controlling the flow rate of the waste activated sludge in response to said calculated WAS flow rate.

6. The method of claim 5 wherein said measurements are collected and transmitted in one second intervals.

7. The method of claim 5 wherein said MLSS and WASSS values used to calculate WAS flow rate are instantaneous values.

8. The method of claim 5 wherein said MLSS and WASSS values used to calculate WAS flow rate are mean values over a fixed predetermined time period.

9. A device for controlling an activated sludge wastewater treatment process in which influent wastewater is mixed with activated sludge in an aeration tank to form a mixed liquor, the mixed liquor being directed to a clarifier wherein a portion of the activated sludge settles from the mixed liquor such that a portion of the settled activated sludge, the return activated sludge, is drawn from said clarifier and returned to said aeration tank and the remaining settled activated sludge, the waste activated sludge, is wasted from said clarifier, comprising:

instrumentation measuring suspended solids concentration in the waste activated sludge, WASSS;

instrumentation measuring suspended solids concentration in the aeration tank, MLSS;

a data processor having at least one data structure storing the volume of the aeration tank, $V_{AerationTank}$, said data processor communicating with said WASSS measuring instrumentation, said MLSS measuring instrumentation, and an input device, whereby said data processor calculates the flow rate of the waste activated sludge, WAS flow rate, to reach a desired solids retention time, $SRT_{Desired}$, input at the input device according to the formula:

$$WAS\ flow\ rate = \frac{MLSS \times V_{AerationTank}}{SRT_{Desired} \times WASSS};\ and$$

an output device communicating with the data processor for outputting the calculated WAS flow rate for control of the flow rate of the waste activated sludge.

10. The device of claim 9 wherein said instrumentation comprises:

a probe;

a suspended solids analyzer communicating with said probe to measure suspended solids concentration proximate the probe; and communications device to transmit measurements from said suspended solids analyzer to said data processor.

11. The device of claim 10 wherein said instrumentation further comprises a memory device communicating with the suspended solids analyzer to store measurements from said suspended solids analyzer.

12. The device of claim 9 wherein said output device is a display.

13. The device of claim 9 wherein the flow rate of the waste activated sludge is determined by a valve and said output device is a controller to open or close said valve to reach the calculated WAS flow rate.

14. The device of claim 9 wherein the flow rate of the waste activated sludge is determined by a variable speed pump and said output device is a controller to increase or decrease the speed of said pump to reach the calculated WAS flow rate.

* * * * *